Oct. 7, 1930. L. GARRISON Re. 17,820
AUTOMATIC STOKER CONTROL
Original Filed Sept. 12, 1927
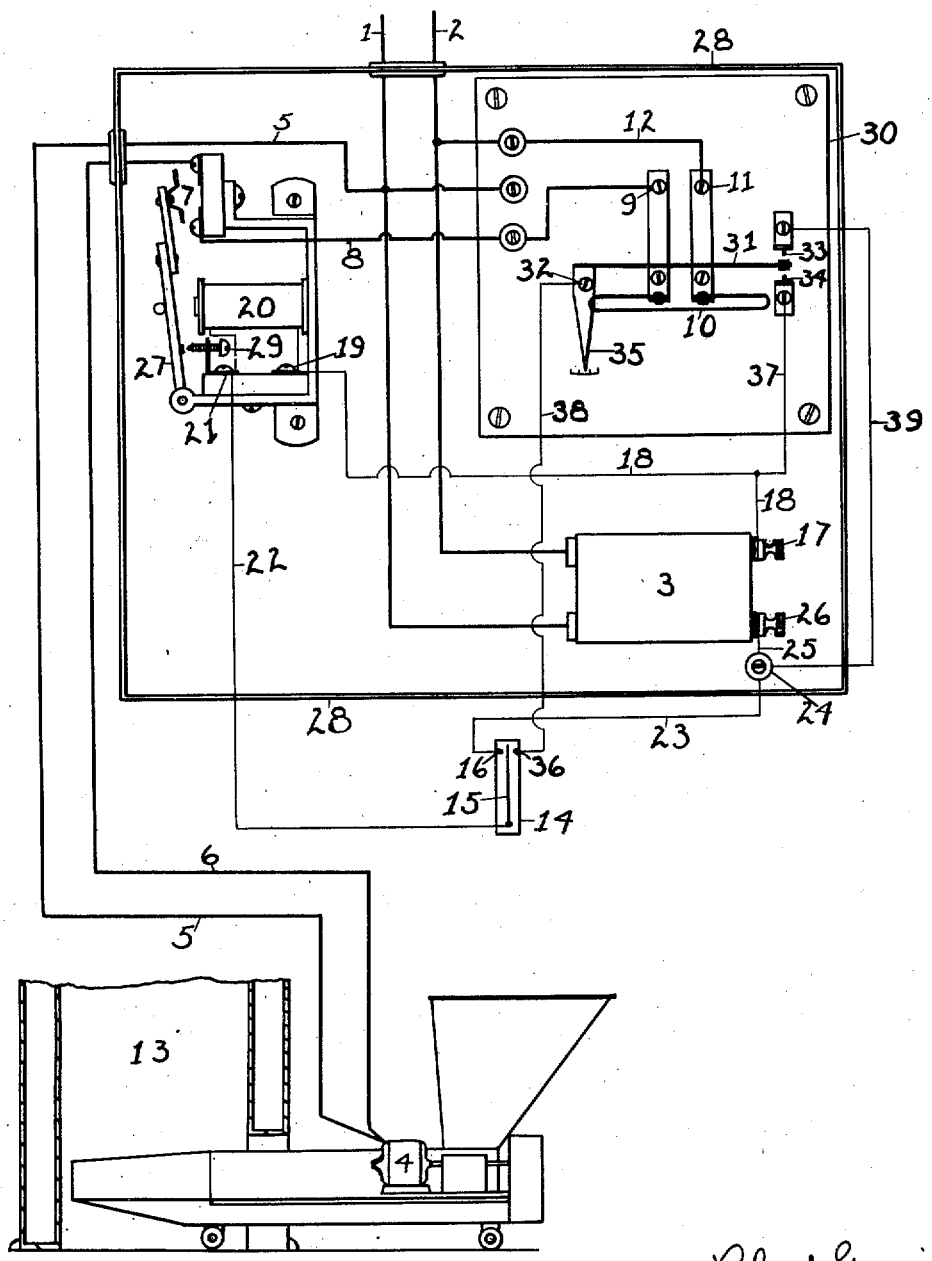
Lloyd Garrison
INVENTOR Reissued Oct. 7, 1930

Re. 17,820

UNITED STATES PATENT OFFICE

LLOYD GARRISON, OF SALT LAKE CITY, UTAH

AUTOMATIC STOKER CONTROL

Original No. 1,679,418, dated August 7, 1928, Serial No. 219,109, filed September 12, 1927. Application for reissue filed March 17, 1930. Serial No. 437,253.

The object of my invention is to provide means auxiliary to the ordinary control of an automatic stoker which will cause the stoker to operate occasionally and prevent extinction of the fire regardless of the conditions which operate the ordinary control.

Heat producing devices using coal, oil, gas, or other fuel are ordinarily controlled in their operation by a thermostatic or pressure device which has as the object of its operation the maintenance of a fairly uniform temperature in the rooms or space heated by the furnace to which such heat producing device supplies heat. With such control the temperature of the space heated may, on comparatively warm days, remain above the upper limit of the control device setting for considerable periods of time, and, if such periods are too long, the failure of a coal stoker to operate may cause the fire to become extinguished. My invention provides means auxiliary to ordinary controls, which, by causing occasional operation of the stoker for short periods of time regardless of the ordinary control prevents the fire becoming extinguished.

In the accompanying drawing which shows a plan and wiring diagram of my device, 1 and 2 represent ordinary 110 volt alternating current leads which supply transformer 3 and also the stoker motor 4 through branch lead 5, wire 6, switch 7, wire 8, terminal 9, resistance wire 10, terminal 11 and wire 12. Temperature of the space heated by furnace 13 is controlled by thermostat 14. When the lower limit of temperature is reached thermostat strip 15 touches contact 16 closing a circuit from transformer terminal 17 through wire 18, terminal 19, coil 20, terminal 21, wire 22, strip 15, contact 16, wire 23, ground connection 24 and wire 25 to the transformer at terminal 26. When coil 20 is energized it attracts armature 27 and closes switch 7, causing the motor to operate the stoker. The apparatus is housed in a metal box 28 and movement of armature 27 towards coil 20 brings the armature into contact with screw 29 which thereafter conveys the current from the coil direct to the switch frame and box whence it finds its way back through ground connection 24 to the transformer, thus short circuiting the thermostat and maintaining the current through coil 20 after rising temperature causes strip 15 and contact 16 to separate. Terminals 9 and 11 are supported on an insulating block 30 which also supports a bimetallic thermostat strip 31, fastened by one screw 32. Strip 31 is adapted to contact under the influence of temperature variations with contact points 33 and 34. It bends towards 33 as the temperature decreases and towards 34 with increasing temperature. The position of strip 31 can be varied relative to the contact points by rotating pointer 35 about screw 32, thus causing the contact between strip 31 and contact 33 to take place at any desired temperature.

The motor current passing through resistance wire 10 generates heat which raises the temperature of strip 31 and causes it to bend downward until it touches point 34. As soon thereafter as thermostat strip 15 touches contact 36 a circuit is closed from transformer terminal 17 through wire 18, wire 37, contact point 34, strip 31, wire 38, contact 36, strip 15, wire 22, and screw 29 to the box and back to the transformer through ground connection 24. This circuit shorts coil 20 and immediately releases armature 27 which falls back into the position shown and breaks contact with screw 29, thus breaking the transformer short circuit which acted to release the armature. Coil 20 is also energized and the motor started when strip 31 cools sufficiently to touch point 33 and close a circuit from the transformer terminal 17 through wire 18, coil 20, wire 22, strip 15, contact 36, wire 38, strip 31, point 33, wire 39, ground connection 24, and back to the transformer. This circuit is not operative when strip 15 does not touch contact 36.

The effect of the circuit arrangement heretofore described is to cause the stoker to operate whenever decrease in temperature causes thermostat strip 15 to touch contact 16. A short period of running causes sufficient heat to be given off by resistance wire 10 to bend strip 31 into contact with point 34. As soon as strip 15 touches contact 36 the stoker is stopped. Thereafter as long as the temperature at the thermostat is such that contact between strip 15 and contact 36 is maintained, strip 31 by its oscillation between points 33 and 34, due to heating and cooling, causes an intermittent operation of the stoker. It will be observed that the stoker will not be stopped after starting until strip 15 touches contact 36. The practical effect of the apparatus is to cause the stoker to be operated by the thermostat as long as the temperature of the space heated is below the upper limit of the thermostat, but as soon as the temperature rises to the upper limit there is substituted for the thermostat control an intermittent control which serves to maintain the fire regardless of the temperature requirements.

The intermittent control has no definite or wholly regular period of operation; the box containing the apparatus is usually placed in the basement adjacent to the furnace and varying relative temperature conditions within the box and in the furnace room cause some variation in the periods. The device will, however, maintain the fire in the average stoker in first class condition at all times when it might otherwise become extinguished if the stoker was actuated only by some form of control designed to maintain a fairly constant temperature in the space heated by the furnace. The plan and wiring diagram shown is one of several that I have used and it is not the intent of this application to restrict the use of the principles shown to the specific plan and wiring shown.

What I claim as my invention is:

1. The combination of a mechanical fuel feed, a furnace operated in connection therewith, a device to control the operation of the fuel feed according to the amount of heat required to be delivered by the furnace, and a device actuated by the operation and non-operation of an electrically heated unit to cause intermittent operation of the fuel feed at such times as the operation of the fuel feed would otherwise be stopped by action of the first named control device.

2. The combination of a mechanical fuel feed, a furnace operated in connection therewith, a device to control the operation of the fuel feed according to the amount of heat required to be delivered by the furnace, and a thermostatic device housed within a compartment that is electrically heated during the operation of the fuel feed, which thermostatic device is actuated by the temperature variations within the compartment and causes the fuel feed to operate intermittently at such times as the fuel feed would otherwise be stopped by the action of the first named control device.

3. The combination of a stoker, a furnace operated in connection with the stoker, a device to control the operation of the stoker according to the amount of heat required to be delivered by the furnace, and a heat operated device to cause intermittent operation of the stoker at such times as the operation of the stoker would otherwise be stopped by action of the first named control device.

4. The combination of a stoker, a furnace operated in connection with said stoker, a device to control the operation of the stoker according to the temperature of the air heated by the furnace, and an auxiliary device actuated by heat to cause intermittent operation of the stoker when the temperature of the air heated by the furnace is above a certain predetermined value.

5. The combination of a stoker, a furnace operated in connection with the stoker, a device to control the operation of the stoker according to the amount of heat required to be delivered by the furnace, and a device actuated by heat to cause intermittent operation of the stoker at such times as the operation of the stoker would otherwise be stopped by the action of heat delivered by the furnace.

6. The combination of a stoker, a furnace operated in connection with the stoker, a device to control the operation of the stoker according to the amount of heat required to be delivered by the furnace, and a device actuated by heat generated during the operation of the stoker to cause intermittent operation of the stoker at such times as the operation of the stoker would otherwise be stopped by the action of heat delivered by the furnace.

7. The combination of a stoker, a furnace operated in connection with the stoker, a device to control the operation of the stoker according to the amount of heat required to be delivered by the furnace, and a device actuated by the heat emanating from a resistance wire in series with the motor driving the stoker to cause intermittent operation of the stoker at such times as the operation of the stoker would otherwise be stopped by action of the first named control device.

8. The combination of a mechanical fuel feed, a device to control the operation of the fuel feed according to the amount of heat required to be delivered by the fuel feed, and a device actuated by the operation and non-operation of an electrically heated unit to cause intermittent operation of the fuel feed at such times as the first named control device would not cause operation of the fuel feed.

9. The combination of a mechanical fuel feed, a device to control the operation of the fuel feed according to the amount of heat required to be delivered by the fuel feed, and an auxiliary device operated by heat generated during the operation of the fuel feed to cause intermittent operation of the fuel feed at such times as the first named control device would not cause operation of the fuel feed.

10. The combination of a mechanical fuel feed, a device to control the operation of the fuel feed according to the amount of heat required to be delivered by the fuel feed, and an auxiliary device actuated by heat generated and dissipated during the operation and non-operation of the fuel feed to cause intermittent operation of the fuel feed at such times as the first named control device would not cause operation of the fuel feed.

LLOYD GARRISON.